US011536158B2

(12) United States Patent
Joo et al.

(10) Patent No.: US 11,536,158 B2
(45) Date of Patent: Dec. 27, 2022

(54) TURBOMACHINE

(71) Applicant: DOOSAN ENERBILITY CO., LTD, Changwon (KR)

(72) Inventors: Sung Jong Joo, Seongnam (KR); Seung Jin Song, Seoul (KR); Bon Han Goo, Incheon (KR); Geon Hwan Cho, Changwon (KR)

(*) Notice: Subject to any disclaimer, the term of this patent is extended or adjusted under 35 U.S.C. 154(b) by 0 days.

(21) Appl. No.: 17/689,433

(22) Filed: Mar. 8, 2022

(65) Prior Publication Data
US 2022/0333502 A1 Oct. 20, 2022

(30) Foreign Application Priority Data
Mar. 12, 2021 (KR) .......................... 10-2021-0032706

(51) Int. Cl.
*F01D 11/08* (2006.01)
*F01D 25/12* (2006.01)

(52) U.S. Cl.
CPC .............. *F01D 25/12* (2013.01); *F01D 11/08* (2013.01); *F05D 2220/30* (2013.01); *F05D 2240/55* (2013.01); *F05D 2260/20* (2013.01)

(58) Field of Classification Search
CPC ...... F01D 25/12; F01D 11/001; F01D 11/008; F01D 11/02; F01D 11/08; F01D 2260/20; F05D 2220/30; F05D 2240/55
See application file for complete search history.

(56) References Cited

U.S. PATENT DOCUMENTS

| | | | |
|---|---|---|---|
| 5,358,374 A * | 10/1994 | Correia | F01D 5/081 |
| | | | 415/115 |
| 7,114,339 B2 * | 10/2006 | Alvanos | F01D 5/081 |
| | | | 415/115 |
| 7,189,055 B2 * | 3/2007 | Marini | F01D 5/081 |
| | | | 415/115 |
| 8,083,475 B2 | 12/2011 | Bulgrin | |

(Continued)

OTHER PUBLICATIONS

EP Office Action dated Aug. 11, 2022.
KR Office Action dated Oct. 4, 2022.

*Primary Examiner* — Igor Kershteyn
(74) *Attorney, Agent, or Firm* — Harvest IP Law, LLP (57) ABSTRACT

A turbomachine is provided. The turbomachine includes a casing, a first airfoil disposed inside the casing such that a fluid passes through the first airfoil while flowing through the casing, a first inner frame coupled to a radially inner end of the first airfoil, a first inner wing protruding from the first inner frame in an axial direction of the casing, a second airfoil disposed inside the casing and between adjacent first airfoils in a flow direction of a fluid, a second inner frame coupled to a radially inner end of the second airfoil and disposed adjacent to the first inner frame, a second inner wing protruding from the second inner frame along the axial direction of the casing and disposed adjacent to the first inner wing, and a plurality of rim seals disposed between the first inner wing and the second inner wing, arranged at intervals along a circumferential direction of the casing, and configured such that cooling air present inside the first and second inner wings in a radial direction flows into each rim seal through an ingress port, passes through each rim seal, and flows out through an egress port, wherein a region on a (Continued)

downstream side of the first airfoil in the flow direction of the fluid flowing through the casing is divided into a first region having a relatively high pressure and a second region having a relatively low pressure, a first flow passage and a second flow passage are provided in a gap between each rim seal, the first flow passage is configured such that a size in the circumferential direction increases from the ingress port to the egress port and the egress port communicates with the first region, and the second flow passage is configured such that a size in the circumferential direction decreases from the ingress port to the egress port and the egress port communicates with the second region.

20 Claims, 8 Drawing Sheets

(56) References Cited

U.S. PATENT DOCUMENTS

| | | | |
|---|---|---|---|
| 8,419,356 B2 | 4/2013 | Little | |
| 9,260,979 B2 * | 2/2016 | Lee | F01D 11/001 |
| 10,619,484 B2 | 4/2020 | Chouhan | |
| 2002/0159880 A1 * | 10/2002 | Morris | F01D 5/145 |
| | | | 415/115 |
| 2004/0265118 A1 | 12/2004 | Naik | |
| 2008/0145208 A1 * | 6/2008 | Klasing | F01D 5/145 |
| | | | 415/173.7 |
| 2013/0318982 A1 | 12/2013 | Kim | |
| 2014/0205443 A1 * | 7/2014 | Lee | F01D 11/02 |
| | | | 415/170.1 |
| 2019/0284946 A1 * | 9/2019 | Berdowski | F01D 11/20 |

* cited by examiner

TURBOMACHINE

CROSS REFERENCE TO RELATED APPLICATION

This application claims priority to Korean Patent Application No. 10-2021-0032706, filed on Mar. 12, 2021, the disclosure of which is incorporated herein by reference in its entirety.

BACKGROUND

1. Field

Apparatuses and methods consistent with exemplary embodiments relate to a turbomachine, and more particularly, to a turbomachine that generates a driving force for power generation by passing high-temperature combustion gas or steam.

2. Description of the Related Art

A turbomachine refers to a device that generates a driving force used to generate electric power with fluid (e.g., gas) passing through the turbomachine. Therefore, a turbomachine and a generator are usually used together. The turbomachine may include gas turbines, steam turbines, and wind power turbines. A gas turbine mixes compressed air and natural gas and burns the mixture to generate combustion gas that is used to generate a driving force for the generation of electric power. A steam turbine heats water to generate steam that is used to generate a driving force for the generation of electric power. A wind turbine converts wind power into a driving force for the generation of electric power.

The gas turbine includes a compressor section, a combustor section, and a turbine section. The compressor section includes a plurality of compressor vanes and a plurality of compressor blades alternately arranged in a compressor casing with an air inlet through which air is introduced. The introduced air is compressed by the compressor vanes and the compressor blades while passing through an inside of the compressor section. The combustor section mixes fuel with the compressed air compressed by the compressor section. In addition, the combustor ignites the fuel-air mixture with an igniter to generate high-temperature and high-pressure combustion gas. The generated combustion gas is supplied to the turbine section. The turbine section includes a plurality of turbine vanes and a plurality of turbine blades alternately arranged in a turbine casing. The combustion gas generated by the combustor rotates the turbine blades while passing through an inside of the turbine section and then is discharged to outside through a turbine diffuser.

The steam turbine includes an evaporator and a turbine. The evaporator generates steam by heating water supplied from the outside. The turbine of the steam turbine includes a plurality of turbine vanes and a plurality of turbine blades alternately arranged in a turbine casing. While the gas turbine uses the combustion gas, the steam turbine uses the steam generated by the evaporator to rotate the turbine blades.

The turbine includes a turbine stator and a turbine rotor which is installed in the turbine stator. The turbine stator includes a turbine casing, turbine vanes coupled to an inner circumferential surface of the turbine casing and arranged in multi stages along a flow direction of fluid to guide the fluid, and a U-ring coupled to a radially inner end of each turbine vane. The turbine rotor includes a turbine disk disposed inside the turbine casing and multi-stage turbine blades installed on an outer circumferential surface of the turbine disk, alternately arranged with the turbine vanes, and rotated by the flow of the fluid.

A wheel-space is formed between the U-ring and the turbine disk adjacent to each other, and cooling air is supplied to the wheel space to cool each component of the turbine heated by high-temperature fluid (e.g., combustion gas or steam). The cooling air supplied to the wheel space cools each component of the turbine while flowing radially outward. For example, using too much cooling air for cooling the turbine reduces the overall efficiency of the turbomachine, and using too little cooling air may cause damage to the turbine due to overheating of each component of the turbine. Therefore, it is important to supply an optimal amount of cooling air.

In a related art turbomachine, a first region having a pressure higher than the wheel space and a second region having a pressure lower than the wheel space are formed in a downstream region of the turbine vane or in a downstream region of the turbine blade. Therefore, the related art turbomachine has a problem in that an ingress phenomenon in which a high-temperature fluid flows into the wheel space occurs in the first region and an excessive amount of cooling air flows out from the wheel space to a region with the turbine vanes and turbine blades occurs in the second region.

SUMMARY

Aspects of one or more exemplary embodiments provide a turbomachine capable of preventing an ingress phenomenon in which a high-temperature fluid flows into a wheel space from an outside in a radial direction and of optimally controlling an amount of cooling air flowing outward in the radial direction from the wheel space (i.e., controlling egress).

Additional aspects will be set forth in part in the description which follows and, in part, will become apparent from the description, or may be learned by practice of the exemplary embodiments.

According to an aspect of an exemplary embodiment, there is provided a turbomachine including: a casing; a first airfoil disposed inside the casing such that a fluid passes through the first airfoil while flowing through the casing; a first inner frame coupled to a radially inner end of the first airfoil; a first inner wing protruding from the first inner frame in an axial direction of the casing; a second airfoil disposed inside the casing and between adjacent first airfoils in a flow direction of the fluid; a second inner frame coupled to a radially inner end of the second airfoil and disposed adjacent to the first inner frame; a second inner wing protruding from the second inner frame in the axial direction of the casing and disposed adjacent to the first inner wing; and a plurality of rim seals disposed between the first inner wing and the second inner wing, arranged at intervals along a circumferential direction of the casing, and configured such that cooling air present inside the first and second inner wings in a radial direction flows into each rim seal through an ingress port, passes through each rim seal, and flows out through an egress port. A region on a downstream side of the first airfoil in the flow direction of the fluid flowing through the casing is divided into a first region having a relatively high pressure and a second region having a relatively low pressure, a first flow passage and a second flow passage are provided in a gap between each rim seal, the first flow passage is configured such that a size in the circumferential direction increases from the ingress port to the egress port and the egress port communicates with the first region, and the second flow passage is configured such that a size in the circumferential direction decreases from the ingress port to the egress port and the egress port communicates with the second region.

The first region may be a region on a downstream side of a trailing edge of the first airfoil, and the second region may be a downstream region of a flow passage between a pressure side and a suction side of the first airfoil.

The first airfoil may be coupled to an inner circumferential surface of the casing and configured to guide the fluid flowing through the casing to the second airfoil, and the second airfoil may be disposed therein spaced apart from the inner circumferential surface of the casing and may be rotated by the fluid flowing through the casing.

The second airfoil may be coupled to an inner circumferential surface of the casing and configured to guide the fluid flowing through the casing to the first airfoil, and the first airfoil may be disposed therein spaced apart from the inner circumferential surface of the casing and may be rotated by the fluid flowing through the casing.

The first inner wing and the second inner wing may be alternately arranged in the radial direction of the casing, and each of the plurality of rim seals may be installed on a surface of the first inner wing facing the second inner wing.

The first inner wing and the second inner wing may be alternately arranged in the radial direction of the casing, and each of the plurality of rim seals may be installed on a surface of the second inner wing facing the first inner wing.

The plurality of rim seals may include: a first rim seal; a second rim seal spaced apart from the first rim seal; in the circumferential direction, gradually inclined toward the first rim seal as a distance to the egress port decreases, and configured to form the second flow passage between the second rim seal and the first rim seal; and a third rim seal spaced apart from the second rim seal in a direction in which the first rim seal is spaced apart from the second rim seal, and configured to form the first flow passage between the second rim seal and the third rim seal.

Each of the first, second, and third rim seals may be formed such that a thickness in the circumferential direction is smaller than a width of each of the first and second flow passages in the circumferential direction.

The first rim seal and the third rim seal may be arranged in the axial direction of the casing.

The first rim seal and the third rim seal extend obliquely along a rotational direction of a disk disposed inside the casing and are inclined from the ingress port to the egress port with respect to the axial direction of the casing.

According to an aspect of another exemplary embodiment, there is provided a turbo machine including: a casing; a first airfoil disposed inside the casing such that a fluid passes through the first airfoil while flowing through the casing; a first inner frame coupled to a radially inner end of the first airfoil; a first inner wing protruding from the first inner frame in an axial direction of the casing; a second airfoil disposed inside the casing and between adjacent first airfoils in a flow direction of the fluid; a second inner frame coupled to a radially inner end of the second airfoil and disposed adjacent to the first inner frame; a second inner wing protruding from the second inner frame in the axial direction of the casing and disposed adjacent to the first inner wing; and a plurality of rim seals disposed between the first inner wing and the second inner wing, arranged at intervals along a circumferential direction of the casing, and configured such that cooling air present inside the first and second inner wings in a radial direction flows into each rim seal through an ingress port, passes through each rim seal, and flows out through an egress port. A region on a downstream side of the first airfoil in the flow direction of the fluid flowing through the casing is divided into a first region having a relatively high pressure and a second region having a relatively low pressure, and a gap between the first inner wing and the second inner wing is provided with a first flow passage configured to communicate with the first region and a second flow passage disposed adjacent to the first flow passage and configured to communicate with the second region. Each of the plurality of rim seals is disposed on a corresponding second flow passage opposite the second region to block the second flow passage to prevent the cooling air introduced through the ingress port from flowing toward the second region.

The first region may be a region on a downstream side of a trailing edge of the first airfoil, and the second region may be a downstream region of a flow passage between a pressure side and a suction side of the first airfoil.

The first airfoil may be coupled to an inner circumferential surface of the casing and configured to guide the fluid flowing through the casing to the second airfoil, and the second airfoil may be disposed therein spaced apart from the inner circumferential surface of the casing and may be rotated by the fluid flowing through the casing.

The second airfoil may be coupled to an inner circumferential surface of the casing and configured to guide the fluid flowing through the casing to the first airfoil, and the first airfoil may be disposed therein spaced apart from the inner circumferential surface of the casing and may be rotated by the fluid flowing through the casing.

The first inner wing and the second inner wing may be alternately arranged in the radial direction of the casing, and each of the plurality of rim seals may be installed on a surface of the first inner wing facing the second inner wing.

The first inner wing and the second inner wing may be alternately arranged in the radial direction of the casing, and each of the plurality of rim seals may be installed on a surface of the second inner wing facing the first inner wing.

Each of the plurality of rim seals may be configured such that a width in the circumferential direction is uniform from the ingress port to the egress port.

Each of the plurality of rim seals may be configured such that a width in the circumferential direction increases toward the egress portion from the ingress port.

Any one of the plurality of rim seals may be formed such that a surface facing an adjacent rim seal is convexly curved toward the adjacent rim seal.

According to an aspect of another exemplary embodiment, there is provided a turbomachine including: a casing; a first airfoil disposed inside the casing such that a fluid passes through the first airfoil while flowing through the casing; a first inner frame coupled to a radially inner end of the first airfoil; a first inner wing protruding from the first inner frame in an axial direction of the casing; a second airfoil disposed inside the casing and between adjacent first airfoils in a flow direction of the fluid; a second inner frame coupled to a radially inner end of the second airfoil and disposed adjacent to the first inner frame; a second inner wing protruding from the second inner frame in the axial direction of the casing and disposed adjacent to the first inner wing; and a plurality of rim seals disposed between the first inner wing and the second inner wing, arranged at intervals along a circumferential direction of the casing, and configured such that cooling air present inside the first and second inner wings in a radial direction flows into each rim seal through an ingress port, passes through each rim seal, and flows out through an egress port. A region on a downstream side of the first airfoil in the flow direction of the fluid flowing through the casing is divided into a first region having a relatively high pressure and a second region having a relatively low pressure, and a gap between the first inner wing and the second inner wing is provided with a first flow passage configured to communicate with the first region and a second flow passage disposed adjacent to the first flow passage and configured to communicate with the second region. Each of the plurality of rim seals is disposed on a corresponding second flow passage opposite the second region to block the second flow passage to prevent the cooling air introduced through the ingress port from flowing toward the second, and each of the plurality of rim seals extends obliquely along a rotational direction of a disk disposed inside the casing and is inclined from the ingress port to the egress port with respect to the axial direction of the casing.

In the turbomachine according to one or more exemplary embodiments, the plurality of rim seals are provided between the first inner wing and the second inner wing, and a gap between each rim seal is provided with the first flow passage and the second flow passage. The first flow passage is configured such that a size in circumferential direction increases from the ingress port to the egress port and communicates with the first region, and the second flow passage is configured such that a size in the circumferential direction decreases from the ingress port to the egress port and communicates with the second region. Thus, the static pressure of the cooling air discharged in the radial direction from the first flow passage is larger than the static pressure of the cooling air discharged from the second flow passage. Therefore, it is possible to prevent the ingress of a high-temperature fluid into the first flow passage from the first region and to optimally control the egress of the cooling air into the second region through the second flow passage.

In the turbomachine according to one or more exemplary embodiments, a gap between each of the first winner wing and the second inner wing is provided with the first flow passage communicating with the first region and the second flow passage disposed adjacent to the first flow passage in the circumferential direction of the casing and communicating with the second region. The plurality of rim seals are disposed on each of the second flow passages to face the second region to block the second flow passages and to prevent the cooling air introduced through the ingress port from flowing into the second region. Therefore, the cooling air in the wheel space is guided only to the first flow passage and the first region to prevent the high-temperature fluid from flowing into the wheel space from the first region.

BRIEF DESCRIPTION OF THE DRAWINGS

The above and other aspects will become more apparent from the following description of the exemplary embodiments with reference to the accompanying drawings, in which.

DETAILED DESCRIPTION

Various changes and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the sprit and technical scope disclosed herein.

The terminology used herein is for the purpose of describing specific embodiments only, and is not intended to limit the scope of the disclosure. The singular expressions "a", "an", and "the" may include the plural expressions as well, unless the context clearly indicates otherwise. In the disclosure, the terms such as "comprise", "include", "have/has" should be construed as designating that there are such features, integers, steps, operations, components, parts, and/or combinations thereof, not to exclude the presence or possibility of adding one or more other features, integers, steps, operations, components, parts and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a turbomachine according to an exemplary embodiment will be described with reference to the accompanying drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Figure 1:
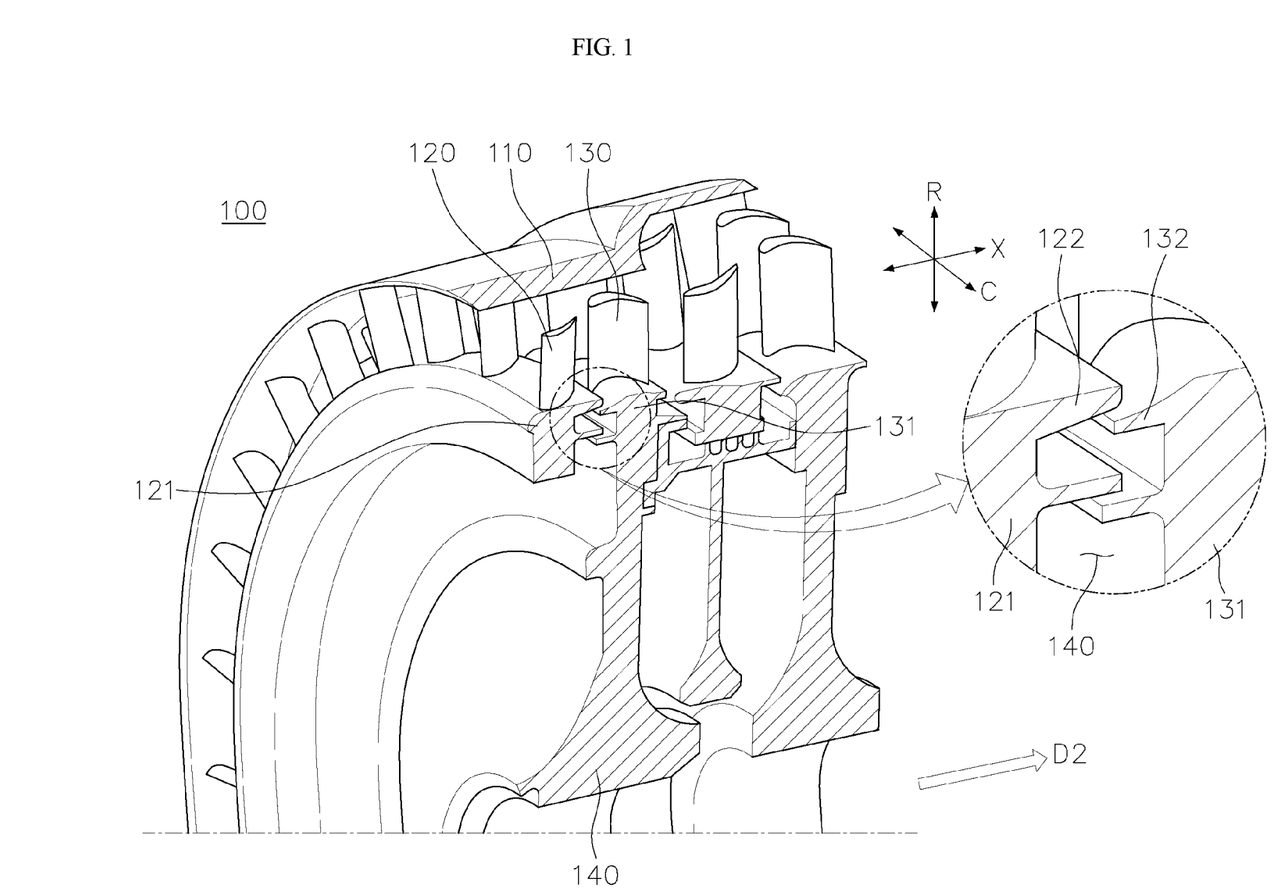
FIG. 1 is a partial cut-away view illustrating an interior of a turbine of a turbomachine.
Figure 2:
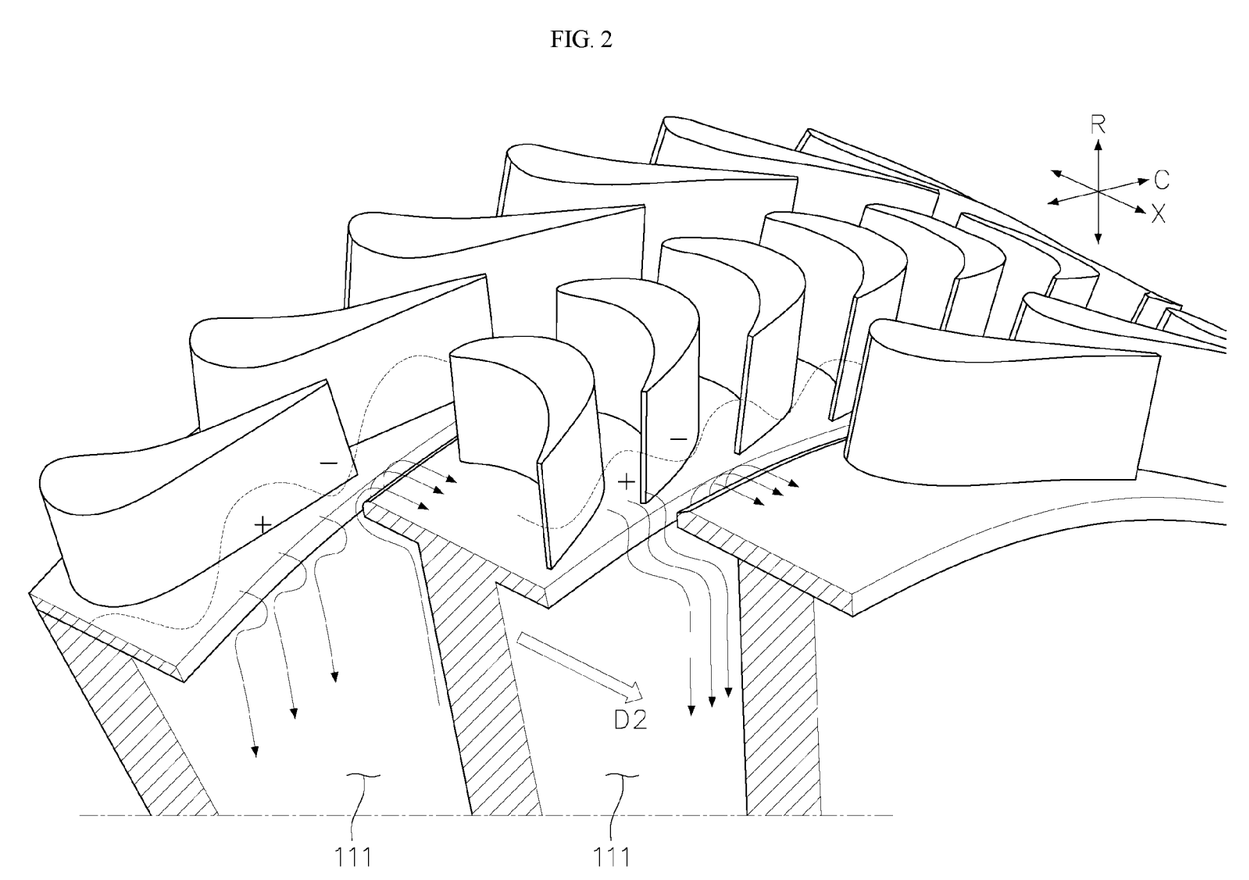
FIG. 2 is a perspective view illustrating an ingress phenomenon and an egress phenomenon occurring in the turbine of FIG. 1.
Figure 3:
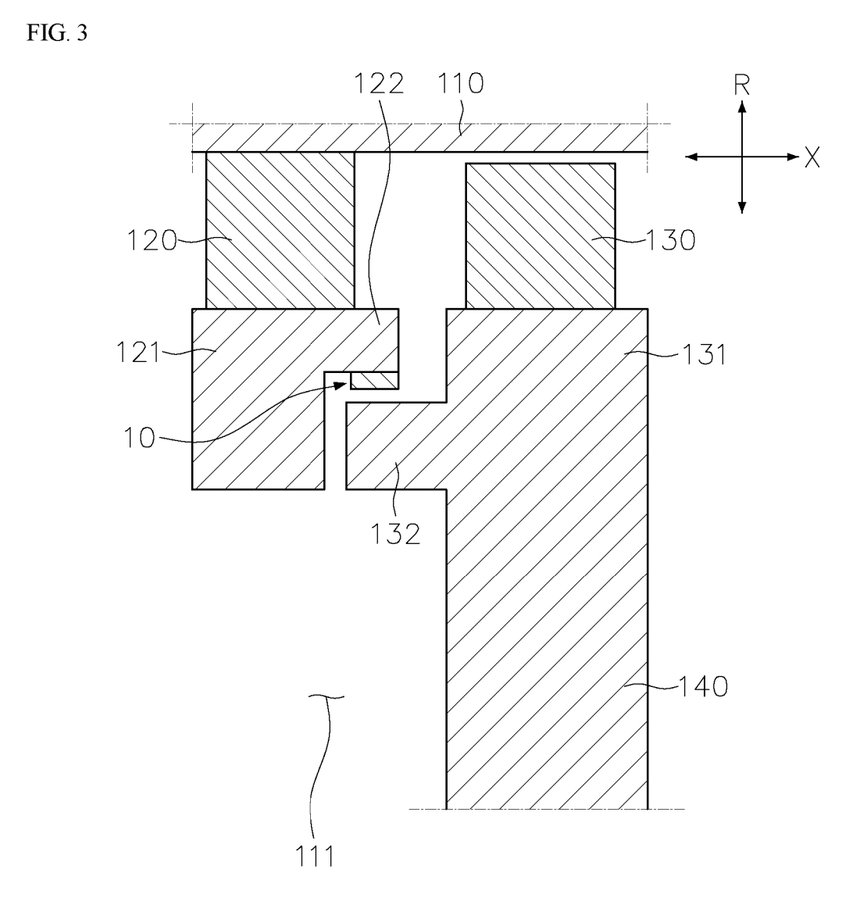
FIG. 3 is a view illustrating multiple rim seals installed between a first inner wing and a second inner wing in the turbine illustrated in FIGS. 1 and 2.
Figure 4:
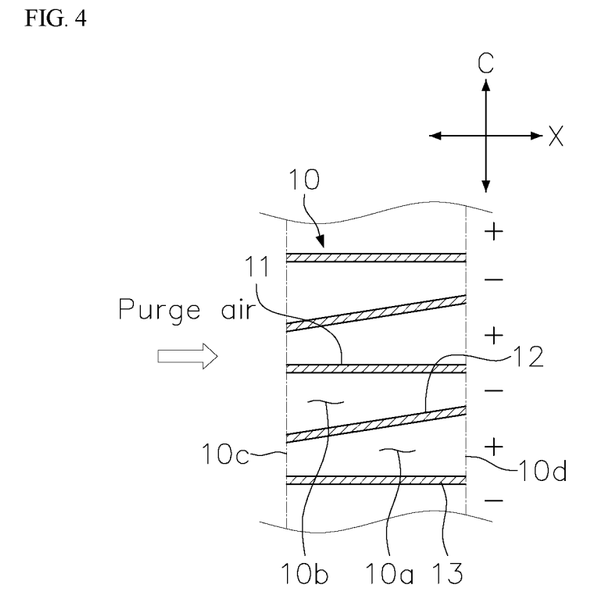
FIG. 4 is a plan view illustrating multiple pins illustrated in FIG. 3 according to a first exemplary embodiment.
Figure 5:
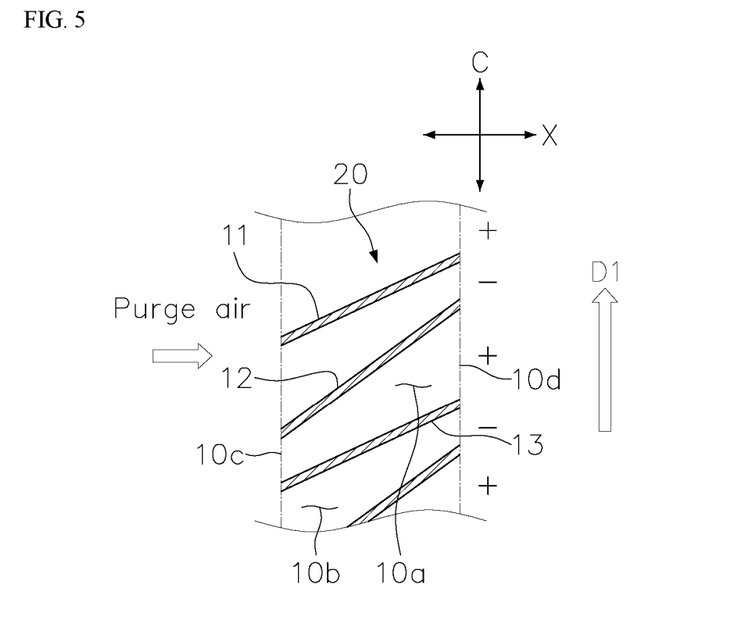
FIG. 5 is a view illustrating a second exemplary embodiment.
Figure 6:
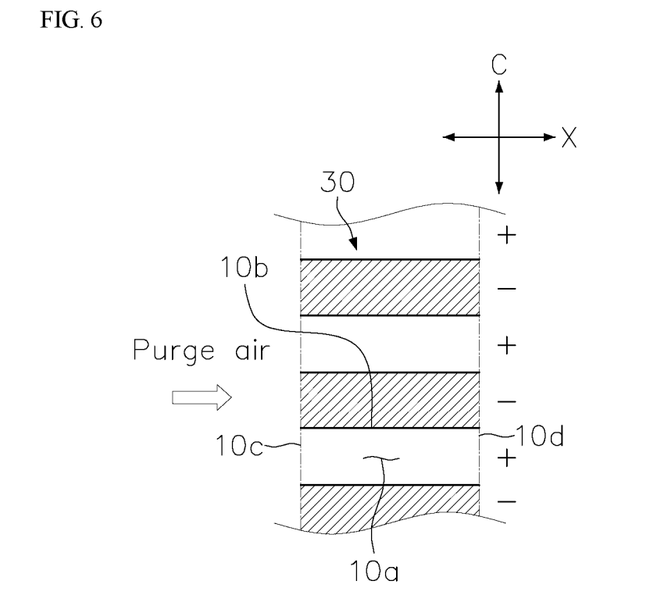
FIG. 6 is a view illustrating a third exemplary embodiment.
Figure 7:
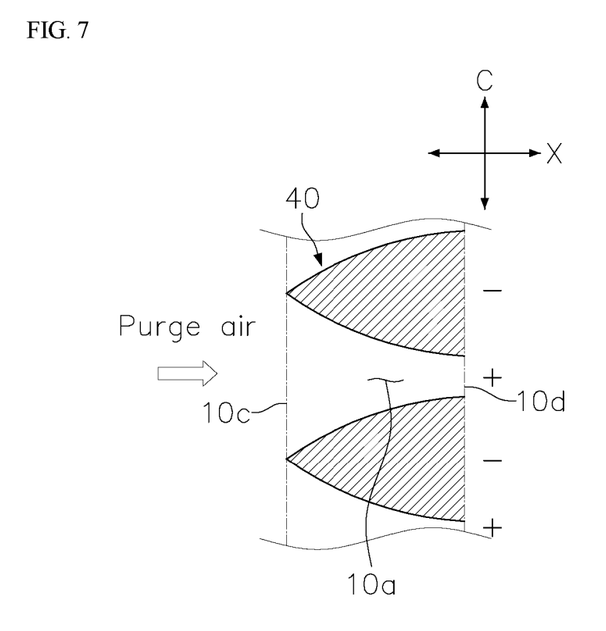
FIG. 7 is a view illustrating a fourth exemplary embodiment.
Figure 8:
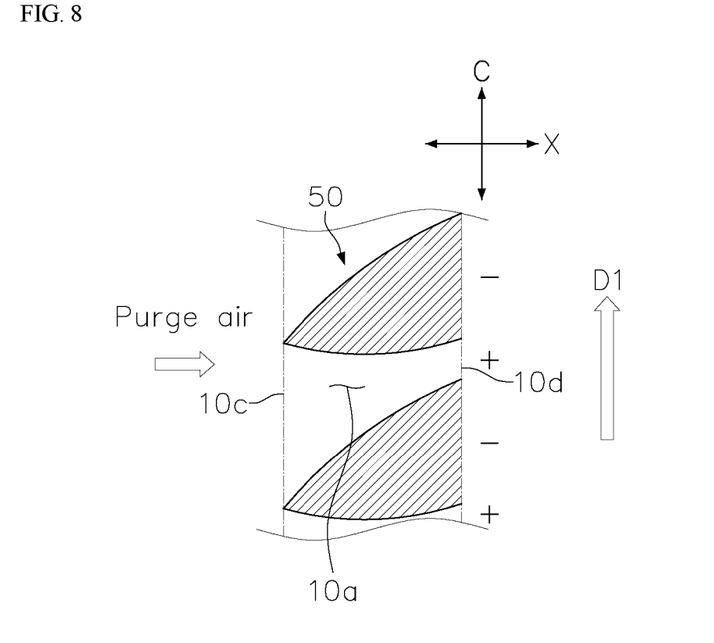
FIG. 8 is a view illustrating a fifth exemplary embodiment.

FIG. 1 is a partial cut-away view illustrating an interior of a turbine of a turbomachine. FIG. 2 is a perspective view illustrating an ingress phenomenon and an egress phenomenon occurring in the turbine of FIG. 1. FIG. 3 is a view illustrating multiple rim seals installed between a first inner wing and a second inner wing in the turbine. FIG. 4 is a plan view illustrating multiple pins illustrated in FIG. 3 according to a first exemplary embodiment. FIG. 5 is a view illustrating a second exemplary embodiment. FIG. 6 is a view illustrating a third exemplary embodiment. FIG. 7 is a view illustrating a fourth exemplary embodiment. FIG. 8 is a view illustrating a fifth exemplary embodiment.

Referring to FIGS. 1 to 8, a turbomachine 100 includes a casing 110, a first airfoil 120, a first inner frame 121, a first inner wing 122, a second airfoil 130, a second inner frame 131, a second inner wing 132, a disk 140, and a plurality of rim seals 10, 20, 30, 40, and 50.

Here, a radial direction of the casing 110 is denoted by R, a circumferential direction of the casing 110 is denoted by C, a longitudinal direction of a virtual axis passing through a center of the casing 110 (that is, an axial direction of the casing 110) is denoted by X, a flow direction of a high-temperature fluid (i.e., combustion gas or steam) flowing through the casing 110 is denoted by $D_1$, and a rotational direction of the disk 140 is denoted by $D_2$. Here, the flow direction $D_1$ of the high-temperature fluid is the same as one of the axial directions (X). The flow direction $D_1$ of the high temperature fluid coincides with the flow direction of cooling air flowing through the plurality of rim seals 10, 20, 30, 40, or 50. In addition, the rotational direction $D_2$ of the disk 140 is the same as one of the circumferential directions C.

Referring to FIGS. 1 to 3, the casing 110 is formed in a shell shape, and the first airfoil 120, the first inner frame 121, the first inner wing 122, the second airfoil 130, the second inner frame 131, the second inner wing, the disk 140, and the multiple rim seals 10, 20, 30, 40, or 50 are disposed in the casing 110.

The first airfoil 120 is accommodated in the casing 110. A plurality of first airfoils 120 may be arranged along the axial direction X in multiple stages, and the high-temperature fluid passes through each of the plurality of first airfoils 120. The first inner frame 121 is coupled to an inner end of the first airfoil 120 in the radial direction R. The first inner wing 122 protrudes from the first inner frame 121 in the axial direction X.

The second airfoil 130 is accommodated in the casing 110. A plurality of second airfoils 130 may be arranged along the axial direction X in multiple stages, and the high-temperature fluid passes through each of the plurality of second airfoils 130. The plurality of second airfoils 130 and the plurality of first airfoils 120 are alternately arranged. The second inner frame 131 is coupled to an inner end of the second airfoil 130 in the radial direction R, and is disposed adjacent to the first inner frame 121. The second inner wing 132 protrudes from the second inner frame 131 in the axial direction X and is disposed adjacent to the first inner wing 122.

The rim seals 10, 20, 30, 40, or 50 are disposed between the first inner wing 122 and the second inner wing 132 and are arranged at intervals along the circumferential direction C. In addition, each rim seal 10, 20, 30, 40, or 50 is structured such that cooling air present in a wheel space 111 disposed inside the first inner wing 122 and the second inner wing 132 in the radial direction R passes therethrough. That is, the cooling air flows into each rim seal 10, 20, 30, 40, or 50 through an ingress port 10c disposed radially inwardly and exits the rim seal 10, 20, 30, 40, or 50 through an egress port 10d disposed radially outwardly.

Referring to FIG. 2, a downstream region of the first airfoil 120 in the flow direction D1 of the fluid is divided into a first region having a relatively high pressure and a second region having a relatively low pressure. Here, the first region is denoted by a plus sign "+" and the second region is denoted by a minus sign "−".

The first region "+" corresponds to a region disposed downstream of a trailing edge of the first airfoil 120. The first regions "+" are spaced apart from each other in the circumferential direction C. Each of the second regions "−" corresponds to a downstream region of a flow passage between a pressure side and a suction side of the first airfoil 120. The second regions "−" are alternately arranged with the first regions "+" in the circumferential direction C.

Here, when the turbomachine 100 is a turbine provided in a gas turbine or a steam turbine, the casing 110 is a turbine casing, the first airfoil 120 corresponds to a turbine vane or a turbine blade, and the second airfoil 130 corresponds to the other one of the turbine vane and the turbine blade.

Referring to FIG. 3, the first airfoil 120 is a turbine vane coupled to the inner circumferential surface of the casing 110 to guide a high-temperature fluid to the downstream side, and the second airfoil 130 is a turbine blade spaced apart from the inner circumferential surface of the casing 110 and is rotated by the high-temperature fluid, the first inner frame 121 corresponds to a U-ring coupled to the inner end of the turbine vane in the radial direction R, and the second inner frame 131 corresponds to a platform. The second inner frame 131 is coupled to the outer circumferential surface of the disk 140 disposed inside the casing 110, and the second airfoil 130 is disposed on the outer circumferential surface of the second inner frame 131.

Alternatively, the first airfoil 120 is a turbine blade spaced apart from the inner circumferential surface of the casing 110 and is rotated by the high-temperature fluid, and the second airfoil 130 is a turbine vane coupled to the inner circumferential surface of the casing 110 to guide the high-temperature fluid to the downstream side, the second inner frame 131 corresponds to a U-ring coupled to the inner end of the turbine vane in the radial direction R, and the first inner frame 121 corresponds to a platform. The first inner frame 121 is coupled to the outer circumferential surface of the disk 140 disposed inside the casing 110, and the first airfoil 120 is disposed on the outer circumferential surface of the first inner frame 121.

In FIG. 3, the turbine vane 120 is coupled to the inner circumferential surface of the turbine casing 110, and the U-ring 121 is coupled to an inner portion of the turbine vane 120 in the radial direction R. The turbine blade 130, the platform 131, and the disk 140 are disposed on a downstream side of the turbine vane 120. The rim seals 10, 20, 30, 40, or 50 are disposed on the downstream side of the turbine vane 120. However, this is only an example. Alternatively, the turbine vane 120 and the U-ring 121 may be disposed on a downstream side of the turbine blade 130, and the platform 131, the disk 140, and the rim seals 10, 20, 30, 40, or 50 may be disposed on the downstream side of the turbine blade 130.

In other words, when the turbomachine corresponds to a turbine provided in a gas turbine or a steam turbine, and the turbine vanes and the turbine blades are alternately arranged in multiple stages in the turbine casing, the plurality of rim seals 10, 20, 30, 40, or 50 may be provided in a region between the downstream side of each turbine vane and the upstream side of each turbine blade and may also be provided in a region between the downstream side of each turbine blade and the upstream side of each turbine vane.

Referring to FIGS. 1 and 2, the first inner wings 122 and the second inner wings 132 may be alternately disposed in the radial direction R. In FIG. 3, the first inner wings 122 are disposed outside the second inner wings 132 in the radial direction R. However, this is only an example. Alternatively, the first inner wings 122 may be disposed inside the second inner wings 132 in the radial direction R.

Referring to FIG. 3, each of the plurality of rim seals 10, 20, 30, 40, or 50 may be installed on a surface of the first inner wing 122 facing the second inner wing 132. However, this is only an example. Alternatively, each of the plurality of rim seals 10, 20, 30, 40, or 50 may be installed on a surface of the second inner wing 132 facing the first inner wing 122.

Referring to FIGS. 4 and 5, a plurality of first flow passages 10a and a plurality of second flow passages 10b are formed between the plurality of rim seals 10 and between the plurality of rim seals 20. The plurality of first flow passages 10a and the plurality of second flow passages 10b are alternately arranged in the circumferential direction C. Here, the first flow passage 10a is formed in a shape in which a size in the circumferential direction C gradually increases from the ingress port 10c to the egress port 10d and communicates with the first region "+". The second flow passage 10b is formed in a shape in which a size in the circumferential direction C gradually decreases from the ingress port 10c to the egress port 10d and communicates with the second region "−".

The plurality of rim seals 10 and the plurality of rim seals 20 include a first rim seal 11, a second rim seal 12, and a third rim seal 13. The first rim seal 11 and the third rim seal 13 are spaced apart from each other in the circumferential direction C. The second rim seal 12 is disposed between the first rim seal 11 and the third rim seal 13, and is inclined towards the first rim seal 11 as it goes towards the egress port 10d from the ingress port 10c. The first flow passage 10a is formed between the second rim seal 12 and the third rim seal 13, and the second flow passage 10b is formed between the second rim seal 12 and the first rim seal 11.

That is, the first flow passage 10a communicating with the first region "+" and the second flow passage 10b communicating with the second region "−" are formed between each of the plurality of rim seals 10 and 20. The first flow passage 10a is formed in a diffuser shape in which a width in the circumferential direction C gradually increases from the ingress port 10c to the egress port 10d, and the second flow passage 10b is formed in a nozzle shape in which a width in the circumferential direction C gradually decreases from the ingress port 10c to the egress port 10d. Therefore, the static pressure of the egress port 10d of the first flow passage 10a is greater than the static pressure of the egress port 10d of the second flow passage 10b.

Because the static pressure at the egress port 10d of the first flow passage 10a increases compared to the related art, the high-temperature fluid present in the first region "+" cannot be transferred to the first flow passage 10a through the egress port 10d. That is, it is possible to prevent the ingress phenomenon occurring in the related art turbomachines. In addition, because the static pressure at the egress port 10d of the second flow passage 10b is reduced compared to the related art, it is possible to prevent excessive egress of cooling air into the second region "−" through the second flow passage 10b.

Referring to FIGS. 4 and 5, each of the plurality of rim seals 10 and 20 is formed such that a thickness in the circumferential direction C is smaller than a width of the first flow passage 10a and a width of the second flow passage 10b in the circumferential direction C. That is, the thickness of each of the plurality of rim seals 10 and 20 in the circumferential direction C is smaller than the width in the circumferential direction C (i.e., length from the ingress port 10c to the egress port 10d of) of each of the first and second passages 10a and 10b.

Referring to FIG. 4, in the plurality of rim seals 10, the first rim seal 11 and the third rim seal 13 are disposed parallel to each other and aligned along the axial direction X The second rim seal 12 may be disposed along the circumferential direction C and may be inclined in the axial direction X from the ingress port 10c to the egress port 10d.

Referring to FIG. 5, in the plurality of rim seals 20, the first rim seal 11 and the third rim seal 13 are inclined from the ingress port 10c to the egress port 10d with respect to the axial direction X and the rotational direction $D_2$ of the disk 140. The second rim seal 12 may be disposed along the circumferential direction C and may be inclined in the axial direction X from the ingress port 10c to the egress port 10d. Here, the second rim seal 12 has a greater inclination with respect to the axial direction X than each of the first rim seal 11 and the third rim seal 13. In this case, the performance of the plurality of rim seals 20 can be improved by adding a circumferential direction velocity vector to the flow of the cooling air flowing along the first flow passage 10a and the second flow passage 10b.

Referring to FIGS. 6 to 8, the plurality of rim seals 30, 40, and 50 are arranged to completely block the egress port 10d of the second flow passage 10b. For example, the plurality of rim seals 30, 40, and 50 are disposed in the second flow passages 10b so that a downstream end of each rim seal faces the second region "—" and blocks the second flow passage 10b, thereby preventing the cooling air introduced through the ingress port 10c from flowing to the second region "−".

In this case, the entire cooling air flowing from the wheel space 111 to the ingress port 10c of each of the plurality of rim seals 30, 40, and 50 is concentrated in the first flow passage path 10a and discharged to the first region "+". Therefore, according to the third to fifth exemplary embodiments, the static pressure at the egress port 10d of the first flow passage 10a is significantly higher than in the related art, and it is possible to prevent the high-temperature air present in the first region "+" from flowing into the egress port 10d of the first flow passage 10a.

Referring to FIG. 6, each of the plurality of rim seals 30 is formed such that the width in the circumferential direction C is uniform from the ingress port 10c to the egress port 10d. In addition, the plurality of rim seals 30 may be disposed parallel to each other and arranged at regular intervals in the circumferential direction C.

Referring to FIG. 7, each of the plurality of rim seals 40 is formed such that the width in the circumferential direction C increases from the ingress port 10c to the egress port 10d. In addition, any one of the plurality of rim seals 40 is formed such that one surface facing an adjacent rim seal 40 is convexly curved toward the adjacent rim seal 40. That is, the convexly curved surface has a curvature. In this case, the cooling air flowing into the ingress portion 10c of each of the plurality of rim seals 40 is directed along each opposing surface of the plurality of rim seals 40 to reach the egress port 10d of each of the plurality of rim seals 40. Accordingly, it is possible to minimize a pressure loss that may occur when the cooling air flows through the first flow passage 10a.

Referring to FIG. 8, each of the plurality of rim seals 50 is inclined along the rotational direction $D_2$ of the disk 140 and further inclined with respect to the axial direction X from the ingress port 10c to the egress port 10d. In this case, the performance of the plurality of rim seals 50 can be improved by adding a circumferential direction velocity vector to the flow of the cooling air flowing along the first flow passage 10a.

The turbomachines 100 according to the first to fifth exemplary embodiments include the rim seals 10, 20, 30, 40, and 50 having various shapes. Accordingly, it is possible to prevent the high-temperature fluid from flowing into the wheel space 111 in the first region "+" and to control the flow rate of the cooling air discharged to the second region "−". That is, it is possible to optimally control the amount of cooling air according to the purpose of the turbomachine.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A turbomachine comprising:
   a casing;
   a first airfoil disposed inside the casing such that a fluid passes through the first airfoil while flowing through the casing;
   a first inner frame coupled to a radially inner end of the first airfoil;
   a first inner wing protruding from the first inner frame in an axial direction of the casing;
   a second airfoil disposed inside the casing and between adjacent first airfoils in a flow direction of the fluid;
   a second inner frame coupled to a radially inner end of the second airfoil and disposed adjacent to the first inner frame;
   a second inner wing protruding from the second inner frame in the axial direction of the casing and disposed adjacent to the first inner wing; and
   a plurality of rim seals disposed between the first inner wing and the second inner wing, arranged at intervals along a circumferential direction of the casing, and configured such that cooling air present inside the first and second inner wings in a radial direction flows into each rim seal through an ingress port, passes through each rim seal, and flows out through an egress port,
   wherein a region on a downstream side of the first airfoil in the flow direction of the fluid flowing through the casing is divided into a first region having a relatively high pressure and a second region having a relatively low pressure, and
   wherein a first flow passage and a second flow passage are provided in a gap between each rim seal, the first flow passage is configured such that a size in the circumferential direction increases from the ingress port to the egress port and the egress port communicates with the first region, and the second flow passage is configured such that a size in the circumferential direction decreases from the ingress port to the egress port and the egress port communicates with the second region.

2. The turbomachine according to claim 1, wherein the first region is a region on a downstream side of a trailing edge of the first airfoil, and
   the second region is a downstream region of a flow passage between a pressure side and a suction side of the first airfoil.

3. The turbomachine according to claim 1, wherein the first airfoil is coupled to an inner circumferential surface of the casing and configured to guide the fluid flowing through the casing to the second airfoil, and
   the second airfoil is disposed therein spaced apart from the inner circumferential surface of the casing and is rotated by the fluid flowing through the casing.

4. The turbomachine according to claim 1, wherein the second airfoil is coupled to an inner circumferential surface of the casing and configured to guide the fluid flowing through the casing to the first airfoil, and
   the first airfoil is disposed therein spaced apart from the inner circumferential surface of the casing and is rotated by the fluid flowing through the casing.

5. The turbomachine according to claim 1, wherein the first inner wing and the second inner wing are alternately arranged in the radial direction of the casing, and
   each of the plurality of rim seals is installed on a surface of the first inner wing facing the second inner wing.

6. The turbomachine according to claim 1, wherein the first inner wing and the second inner wing are alternately arranged in the radial direction of the casing, and
   each of the plurality of rim seals is installed on a surface of the second inner wing facing the first inner wing.

7. The turbomachine according to claim 1, wherein the plurality of rim seals comprise:
   a first rim seal;
   a second rim seal spaced apart from the first rim seal in the circumferential direction, gradually inclined toward the first rim seal as a distance to the egress port decreases, and configured to form the second flow passage between the second rim seal and the first rim seal; and
   a third rim seal spaced apart from the second rim seal in a direction in which the first rim seal is spaced apart from the second rim seal and configured to form the first flow passage between the second rim seal and the third rim seal.

8. The turbomachine according to claim 7, wherein each of the first, second, and third rim seals is formed such that a thickness in the circumferential direction is smaller than a width of each of the first and second flow passages in the circumferential direction.

9. The turbomachine according to claim 7, wherein the first rim seal and the third rim seal are arranged in the axial direction of the casing.

10. The turbomachine according to claim 7, wherein the first rim seal and the third rim seal extend obliquely along a rotational direction of a disk disposed inside the casing and are inclined from the ingress port to the egress port with respect to the axial direction of the casing.

11. A turbo machine comprising:
    a casing;
    a first airfoil disposed inside the casing such that a fluid passes through the first airfoil while flowing through the casing;
    a first inner frame coupled to a radially inner end of the first airfoil;
    a first inner wing protruding from the first inner frame in an axial direction of the casing;
    a second airfoil disposed inside the casing and between adjacent first airfoils in a flow direction of the fluid;
    a second inner frame coupled to a radially inner end of the second airfoil and disposed adjacent to the first inner frame;
    a second inner wing protruding from the second inner frame in the axial direction of the casing and disposed adjacent to the first inner wing; and
    a plurality of rim seals disposed between the first inner wing and the second inner wing, arranged at intervals along a circumferential direction of the casing, and configured such that cooling air present inside the first and second inner wings in a radial direction flows into each rim seal through an ingress port, passes through each rim seal, and flows out through an egress port,
    wherein a region on a downstream side of the first airfoil in the flow direction of the fluid flowing through the casing is divided into a first region having a relatively high pressure and a second region having a relatively low pressure, wherein a gap between the first inner wing and the second inner wing is provided with a first flow passage configured to communicate with the first region and a second flow passage disposed adjacent to the first flow passage and configured to communicate with the second region, and wherein each of the plurality of rim seals is disposed on a corresponding second flow passage opposite the second region to block the second flow passage to prevent the cooling air introduced through the ingress port from flowing toward the second region.

12. The turbomachine according to claim 11, wherein the first region is a region on a downstream side of a trailing edge of the first airfoil, and the second region is a downstream region of a flow passage between a pressure side and a suction side of the first airfoil.

13. The turbomachine according to claim 11, wherein the first airfoil is coupled to an inner circumferential surface of the casing and configured to guide the fluid flowing through the casing to the second airfoil, and the second airfoil is disposed therein spaced apart from the inner circumferential surface of the casing and is rotated by the fluid flowing through the casing.

14. The turbomachine according to claim 11, wherein the second airfoil is coupled to an inner circumferential surface of the casing and configured to guide the fluid flowing through the casing to the first airfoil, and the first airfoil is disposed therein spaced apart from the inner circumferential surface of the casing and is rotated by the fluid flowing through the casing.

15. The turbomachine according to claim 11, wherein the first inner wing and the second inner wing are alternately arranged in the radial direction of the casing, and each of the plurality of rim seals is installed on a surface of the first inner wing facing the second inner wing.

16. The turbomachine according to claim 11, wherein the first inner wing and the second inner wing are alternately arranged in the radial direction of the casing, and each of the plurality of rim seals is installed on a surface of the second inner wing facing the first inner wing.

17. The turbomachine according to claim 11, each of the plurality of rim seals is configured such that a width in the circumferential direction is uniform from the ingress port to the egress port.

18. The turbomachine according to claim 11, each of the plurality of rim seals is configured such that a width in the circumferential direction increases toward the egress portion from the ingress port.

19. The turbomachine according to claim 18, wherein any one of the plurality of rim seals is formed such that a surface facing an adjacent rim seal is convexly curved toward the adjacent rim seal.

20. A turbomachine comprising:

a casing;

a first airfoil disposed inside the casing such that a fluid passes through the first airfoil while flowing through the casing;

a first inner frame coupled to a radially inner end of the first airfoil;

a first inner wing protruding from the first inner frame in an axial direction of the casing;

a second airfoil disposed inside the casing and between adjacent first airfoils in a flow direction of the fluid;

a second inner frame coupled to a radially inner end of the second airfoil and disposed adjacent to the first inner frame;

a second inner wing protruding from the second inner frame in the axial direction of the casing and disposed adjacent to the first inner wing; and a plurality of rim seals disposed between the first inner wing and the second inner wing, arranged at intervals along a circumferential direction of the casing, and configured such that cooling air present inside the first and second inner wings in a radial direction flows into each rim seal through an ingress port, passes through each rim seal, and flows out through an egress port, wherein a region on a downstream side of the first airfoil in the flow direction of the fluid flowing through the casing is divided into a first region having a relatively high pressure and a second region having a relatively low pressure, wherein a gap between the first inner wing and the second inner wing is provided with a first flow passage configured to communicate with the first region and a second flow passage disposed adjacent to the first flow passage and configured to communicate with the second region, wherein each of the plurality of rim seals is disposed on a corresponding second flow passage opposite the second region to block the second flow passage to prevent the cooling air introduced through the ingress port from flowing toward the second, and wherein each of the plurality of rim seals extends obliquely along a rotational direction of a disk disposed inside the casing and is inclined from the ingress port to the egress port with respect to the axial direction of the casing.

* * * * *